United States Patent [19]
Ohara

[11] Patent Number: 5,871,264
[45] Date of Patent: Feb. 16, 1999

[54] STRUCTURE OF DRAWER TYPE COMPUTER HOUSING MOUNTING SYSTEM

[76] Inventor: Takeyoshi Ohara, 2 1, 102, 2978 6, Sugeda Cho, Kanagawa Ku, Yokohama City, Japan

[21] Appl. No.: 8,890

[22] Filed: Jan. 20, 1998

[51] Int. Cl.⁶ .................................................. A47B 88/00
[52] U.S. Cl. .................................... 312/334.7; 312/223.2; 312/334.4; 361/727
[58] Field of Search .............................. 312/223.1, 223.2, 312/223.3, 334.1, 334.7, 334.4, 348.1, 205, 334.16, 330.1; 361/727, 725

[56] References Cited

U.S. PATENT DOCUMENTS

| | | | |
|---|---|---|---|
| 5,340,340 | 8/1994 | Hastings et al. | 361/727 X |
| 5,623,542 | 4/1997 | Krivec | 312/348.1 X |
| 5,653,518 | 8/1997 | Hardt | 361/727 X |
| 5,654,873 | 8/1997 | Smithson et al. | 361/727 X |
| 5,683,159 | 11/1997 | Johnson | 312/334.7 |
| 5,761,033 | 6/1998 | Wilhelm | 361/725 X |

FOREIGN PATENT DOCUMENTS

| | | | |
|---|---|---|---|
| 3001049 | 7/1981 | Germany | 312/223.2 |

Primary Examiner—Peter M. Cuomo
Assistant Examiner—Hanh V. Tran
Attorney, Agent, or Firm—Pro-Techtor International Services

[57] ABSTRACT

A drawer type computer housing mounting system including a computer housing, two sliding rails fastened to two opposite side panels of the computer housing for permitting it to be moved between two sliding tracks in a desk, and a face panel covered on the computer housing at a front side, wherein the sliding rails have each a first wall and a second wall connected at right angles, and a plurality of mounting holes at the first wall and the second wall for connection to oblique locating slots on the two opposite side panels of the computer housing by screws, the first wall and the second wall having different widths so that the sliding rails can be fastened to the computer housing between two positions to fit the pitch between the sliding tracks in the desk.

3 Claims, 7 Drawing Sheets

STRUCTURE OF DRAWER TYPE COMPUTER HOUSING MOUNTING SYSTEM

BACKGROUND OF THE INVENTION

The present invention provides an improvement on U.S. patent application Ser. No. 08/932,632, entitled "Drawer type computer housing mounting structure".

According to U.S. patent application Ser. No. 08/932,632, the two vertical side panels 11;12 of the top cover shell 1 comprise each two rows of vertically spaced circular mounting holes 111;112 symmetrically arranged in parallel; two sliding rails 14 are respectively fastened to the circular mounting holes 111;112 of the vertical side panels 11;12 of the top cover shell 1 at the desired elevation, for enabling the computer housing to be moved in and out of a desk; two pairs of spring plates 13 are respectively connected between the vertical side panels 12;13 and the sliding rails 14 for supporting the sliding rails 14 on the vertical side panels 12;13 of the top cover shell 1; the face panel 3 is mounted in front of the bottom shell 2. This drawer type computer housing mounting structure still has drawbacks as follows:

1. In order not to damage the structural strength of the vertical side panels 11;12, the density of the vertically spaced circular mounting holes 111;112 must be limited. Because of the limitation of the density of the vertically spaced circular mounting holes 111;112, fine adjustment of the elevation of the sliding rails 14 cannot be achieved, and the face panel 3 may not perfectly fit the sliding slot in which the computer housing is inserted.
2. Because the spring plates 13 are respectively connected between the vertical side panels 12;13 and the sliding rails 14 by fastening elements, it is difficult to install the spring plates 13 in a narrow space.
3. Because the spring plates 13 are connected between the vertical side panels 12;13 and the sliding rails 14 and impart an outward pressure to the sliding rails 14 against the inside wall of the desk, much effort must be employed to overcome the friction resistance between the sliding rails 14 and the inside wall of the desk when pulling the computer housing out of the deck.

SUMMARY OF THE INVENTION

The present invention improves the aforesaid disadvantages. According to one aspect of the present invention, the sliding rails have each a first wall and a second wall connected at right angles, and a plurality of mounting holes at the first wall and the second wall for connection to oblique locating slots on the two opposite vertical side panels of the top cover shell of the computer housing by screws. The first wall and the second wall have different widths so that the sliding rails can be fastened to the computer housing between two positions to fit the pitch between the sliding tracks in the desk. According to another aspect of the present invention, sliding clips are mounted in respective vertical sliding slots on the two vertical side panels of the top cover shell, and fixed in position by a respective screw to secure the sliding rails in place. According to still another aspect of the present invention, the face panel has its top and bottom sides respectively mounted with ornamental sheets to fit the gap in the desk.

DETAILED DESCRIPTION OF THE PREFERRED EMBODIMENT

Figure 1:
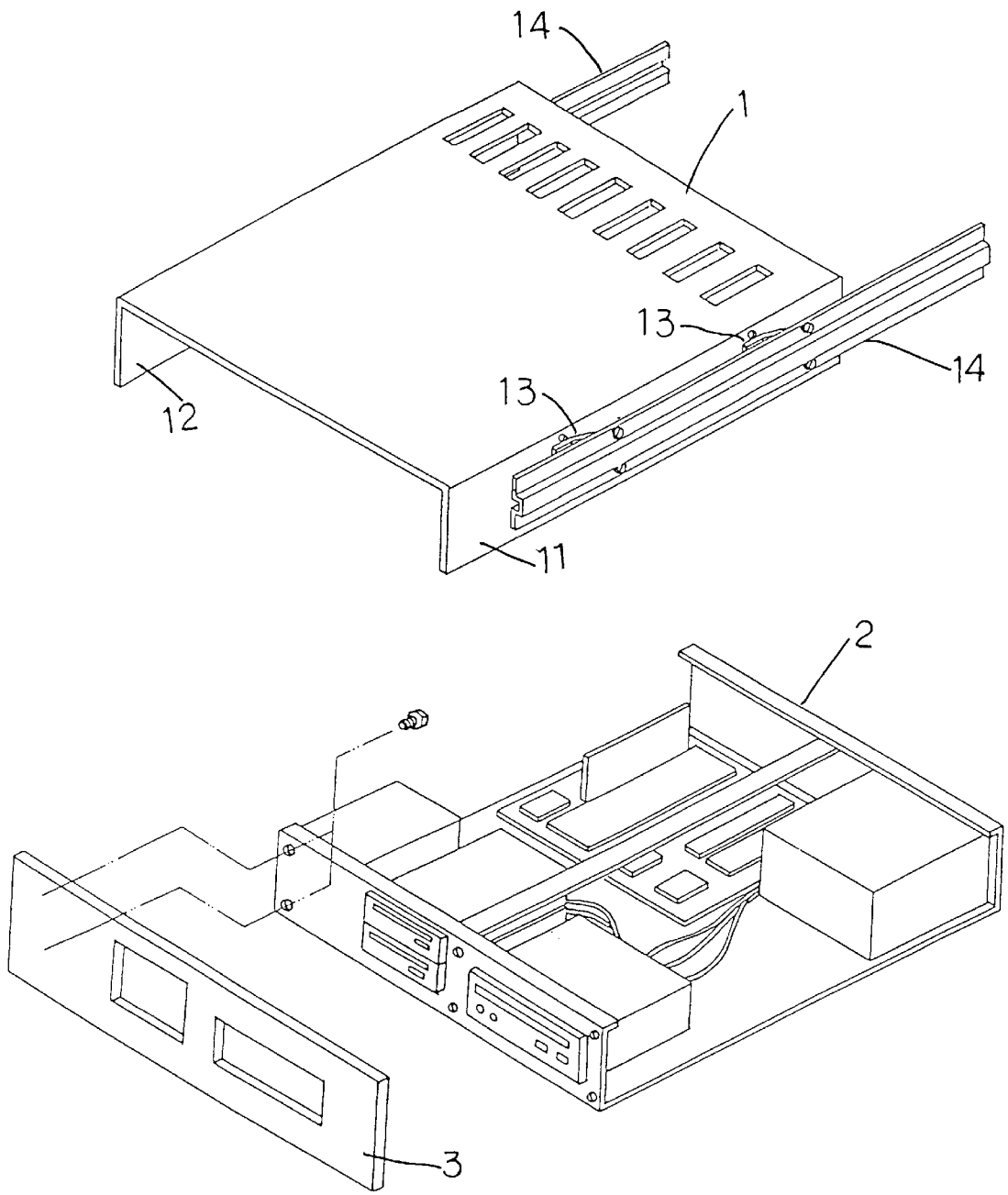
FIG. 1 is an exploded view of a drawer type computer housing mounting structure according to U.S. patent application Ser. No. 08/932,632.
Figure 2:
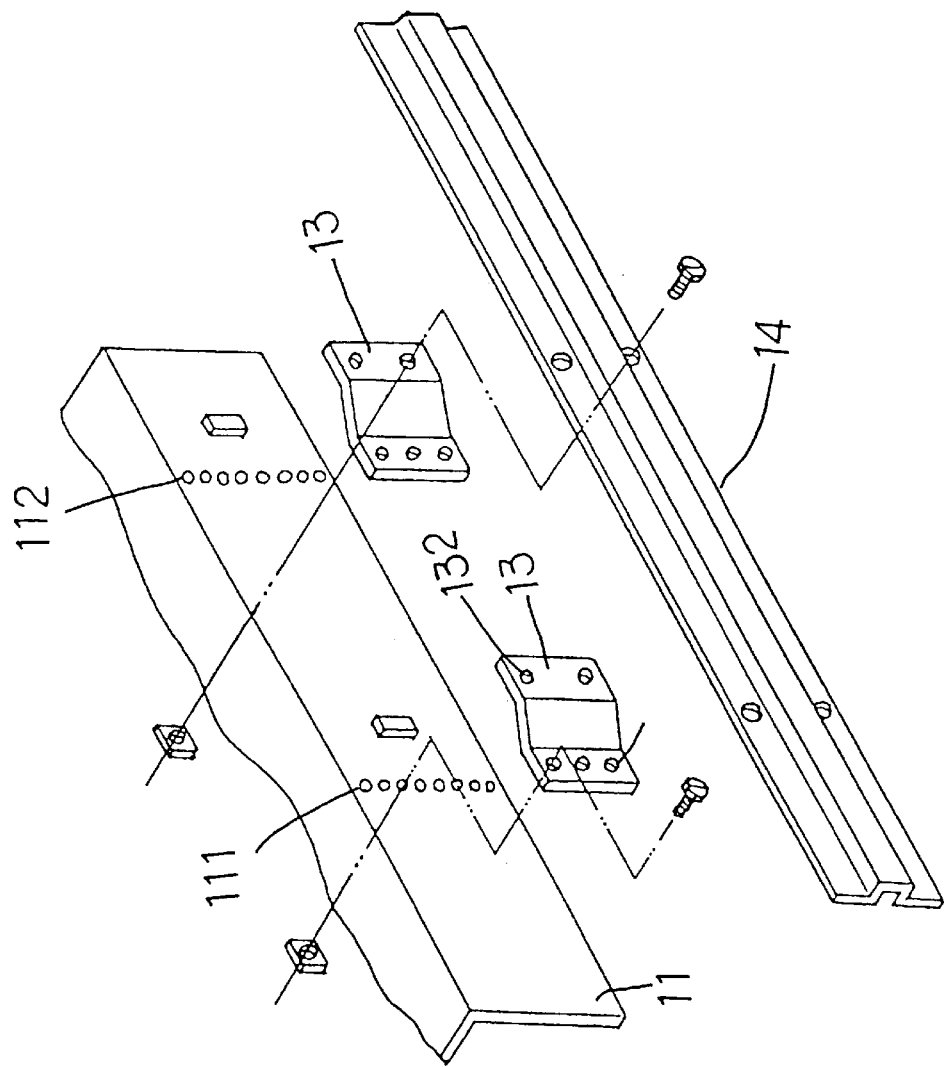
FIG. 2 is an exploded view of a part of FIG. 1, showing the position of the spring plates between the vertical side panel of the top cover shell and the sliding rail.
Figure 3:
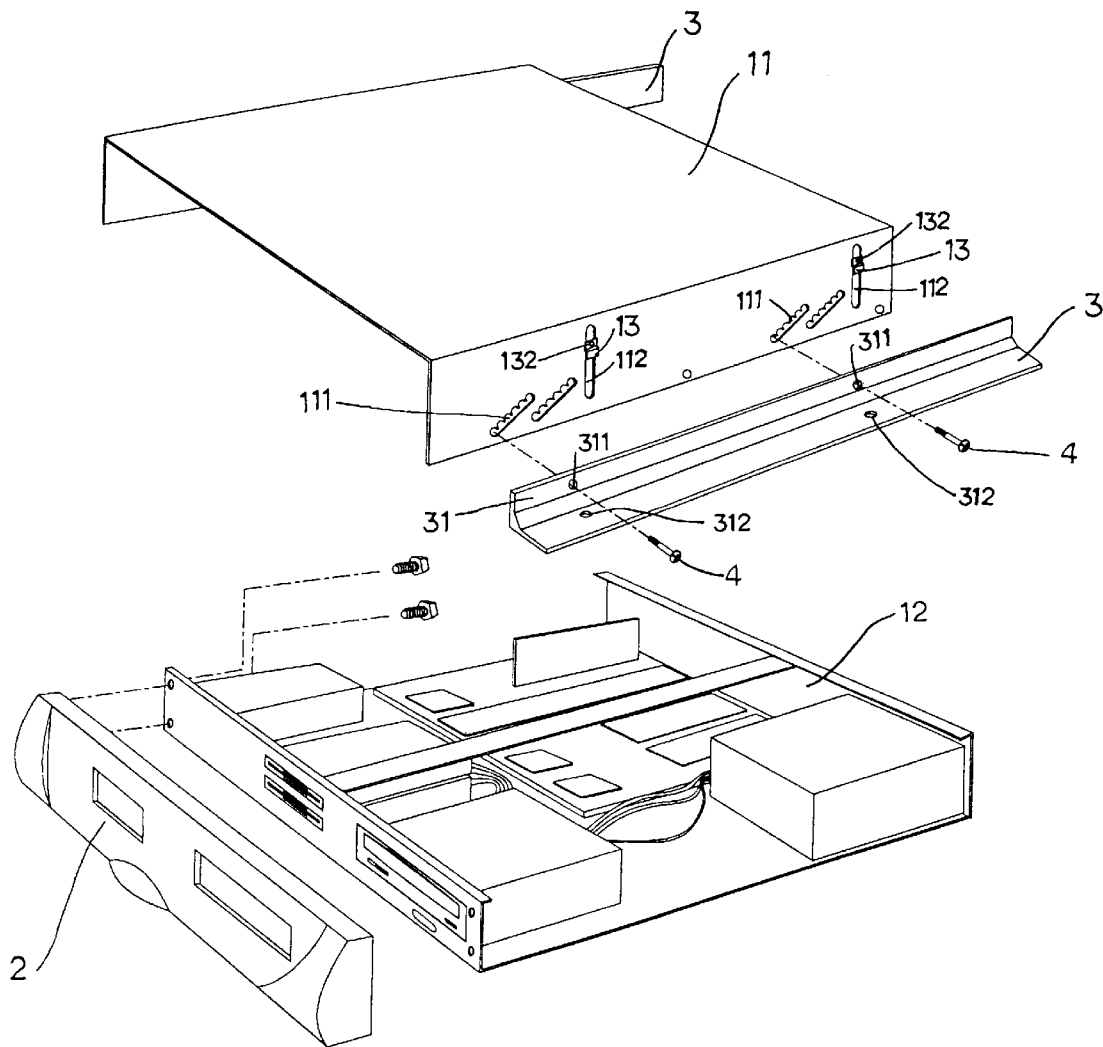
FIG. 3 is an exploded view of the improved structure of drawer type computer housing mounting system according to the present invention.
Figure 4:
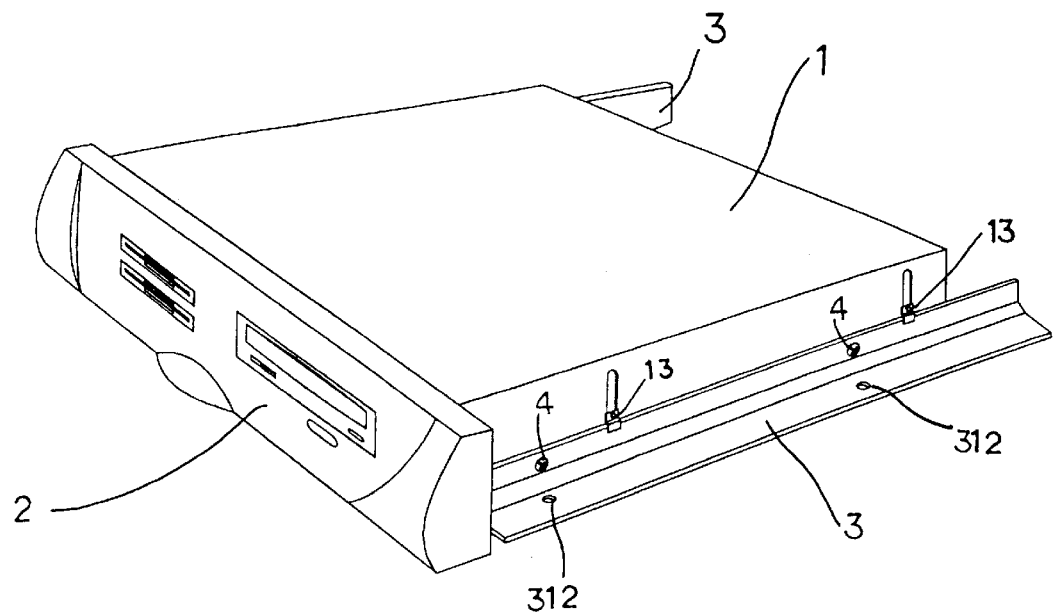
FIG. 4 is a perspective assembly view of the improved structure of drawer type computer housing mounting system shown in FIG. 3.

Referring to FIGS. 3 and 4, the present invention comprises a computer housing 1, a face panel 2, and two sliding rails 3. The computer housing 1 is comprised of a bottom shell 12, a top cover shell 11 for covering on the bottom shell 12. The top cover shell 11 comprises pairs of oblique locating slots 111 and vertical sliding slots 112 at both vertical side walls thereof. The oblique locating slots 111 preferably have each a serrated side edge for positive positioning of a screw. A sliding clip 13 is respectively coupled to each vertical sliding slot 112 by a respective screw 132. When the screw 132 is loosened, the corresponding sliding clip 13 can then be moved along the corresponding vertical sliding slot 112 and then fixed at the desired elevation. The face panel 2 is fastened to the computer housing 1 at its front side by screws. The sliding rails 3 have a substantially L-shaped cross section. Each sliding rails 3 comprises a first wall 31 and a second wall 32 connected at right angles. The walls 31;32 have different widths. Mounting holes 311;312 are respectively provided at the walls 31;32 for connection to the oblique locating slots 111 by screws 4.

Figure 5:
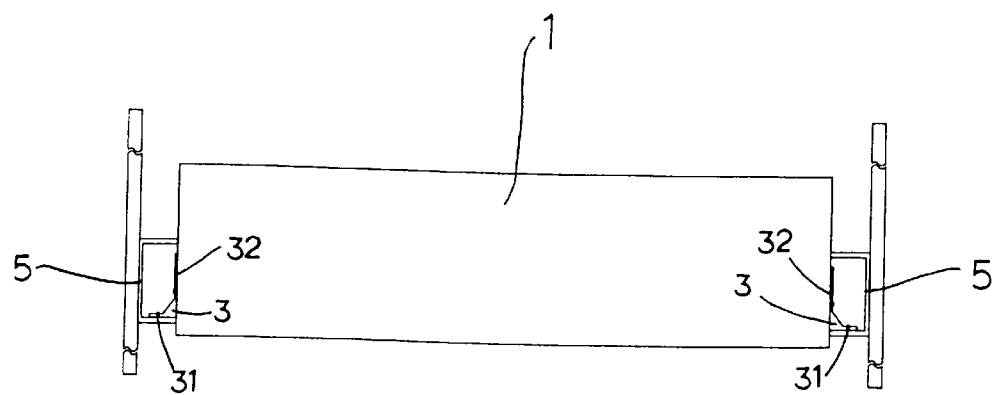
FIG. 5 is a cross sectional view showing the present invention installed in the desk.

Referring to FIG. 5 and FIG. 3 again, the second walls 32 of the sliding rails 3 are fastened to the oblique locating slots 111 at two opposite sides of the top cover shell 11 of the computer housing 1 at the desired elevation by screws 4, the sliding clips 13 are respectively loosened and lowered along the vertical sliding slots 112 and then fixed to the second walls 32 of the sliding rails 3 to secure the sliding rails 3 in place. When assembled, the whole assembly is inserted in between the sliding tracks 5 in the desk, permitting the first walls 31 of the sliding rails 3 to be slidably supported on the sliding tracks 5.

Figure 6:
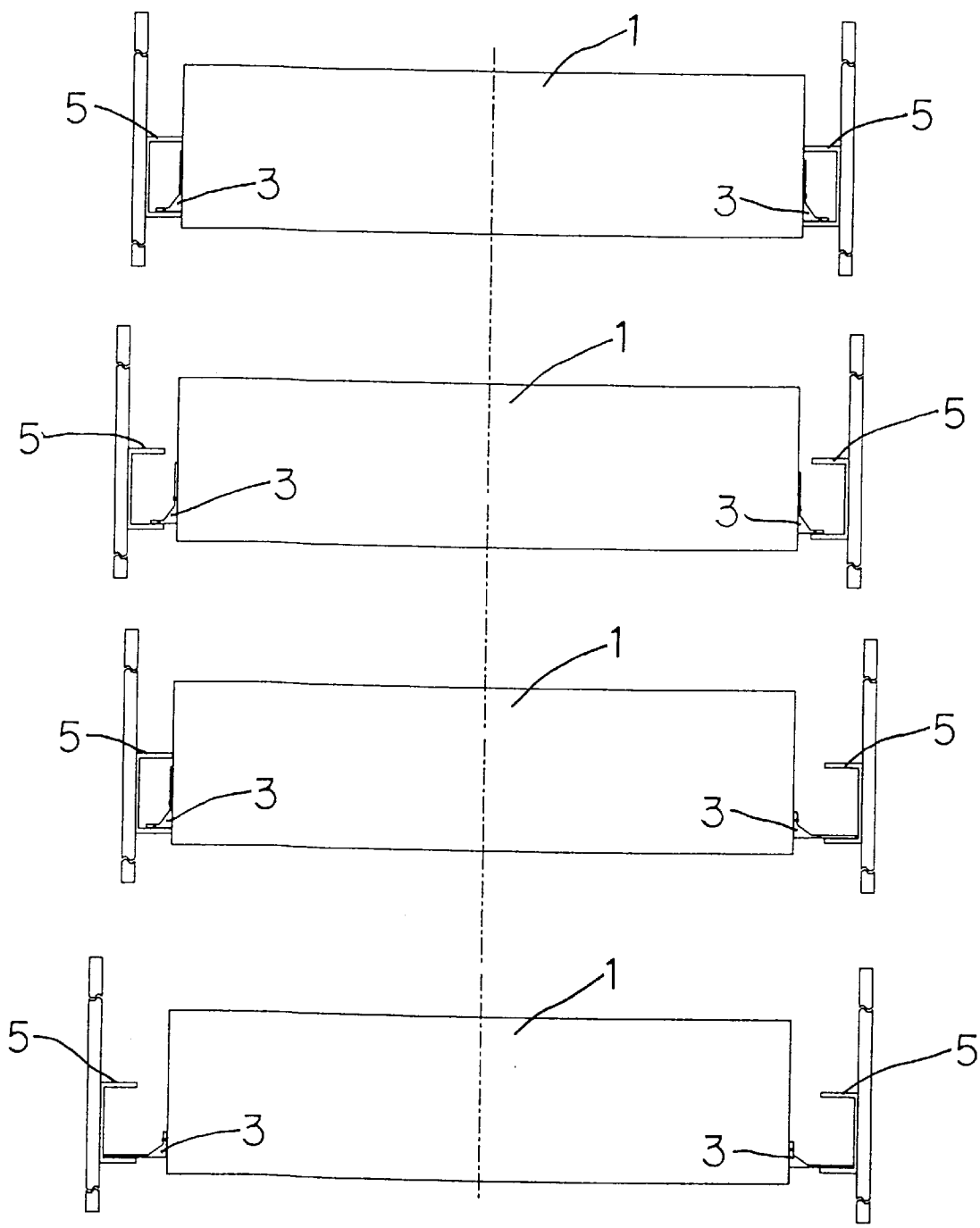
FIG. 6 shows different application examples of the present invention.

Referring to FIG. 6 and FIG. 3 again, the first walls 31 and second walls 32 of the sliding rails 3 can be selectively fastened to the oblique locating slots 111 on the top cover shell 11 subject to the pitch between the sliding tracks 5. The pitch between the sliding tracks 5 is about within 355 mm to 365 mm. When the narrower first walls 31 of the sliding rails 3 are respectively fastened to the oblique locating slots 111 on the top cover shell 11, the whole assembly fits the pitch of about within 360 mm to 365 mm. On the contrary, when the wider second walls 32 of the sliding rails 3 are respectively fastened to the oblique locating slots 111 on the top cover shell 11, the whole assembly fits the pitch of about within 355 mm to 360 mm.

Figure 7:
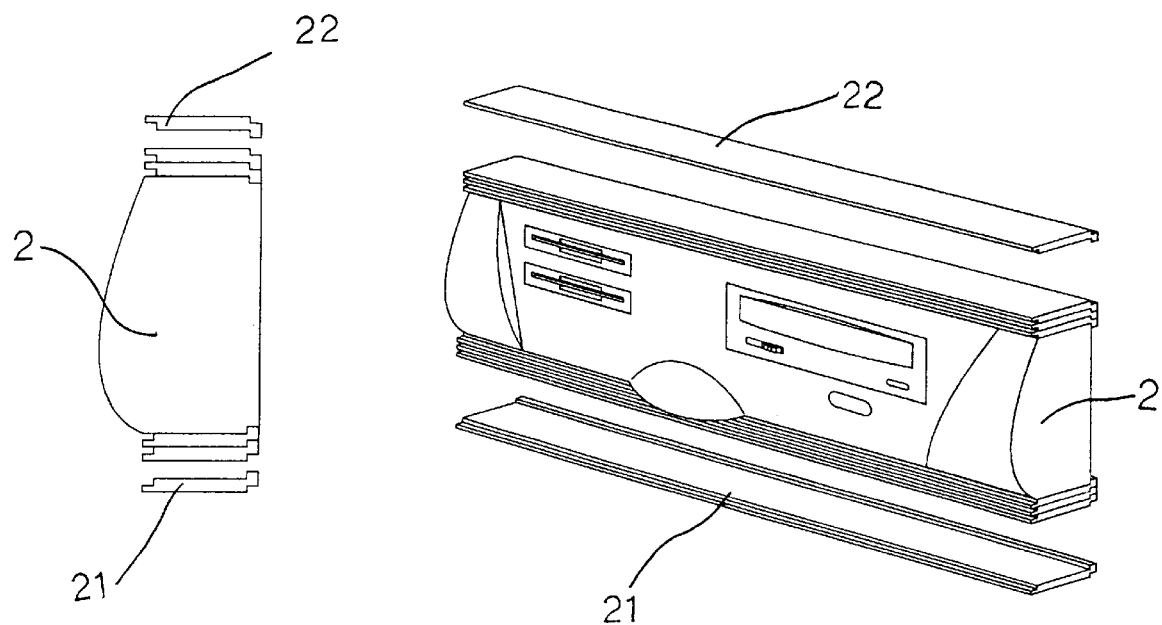
FIG. 7 shows the face panel decorated with ornamental sheets at its top and bottom sides.
Figure 8:
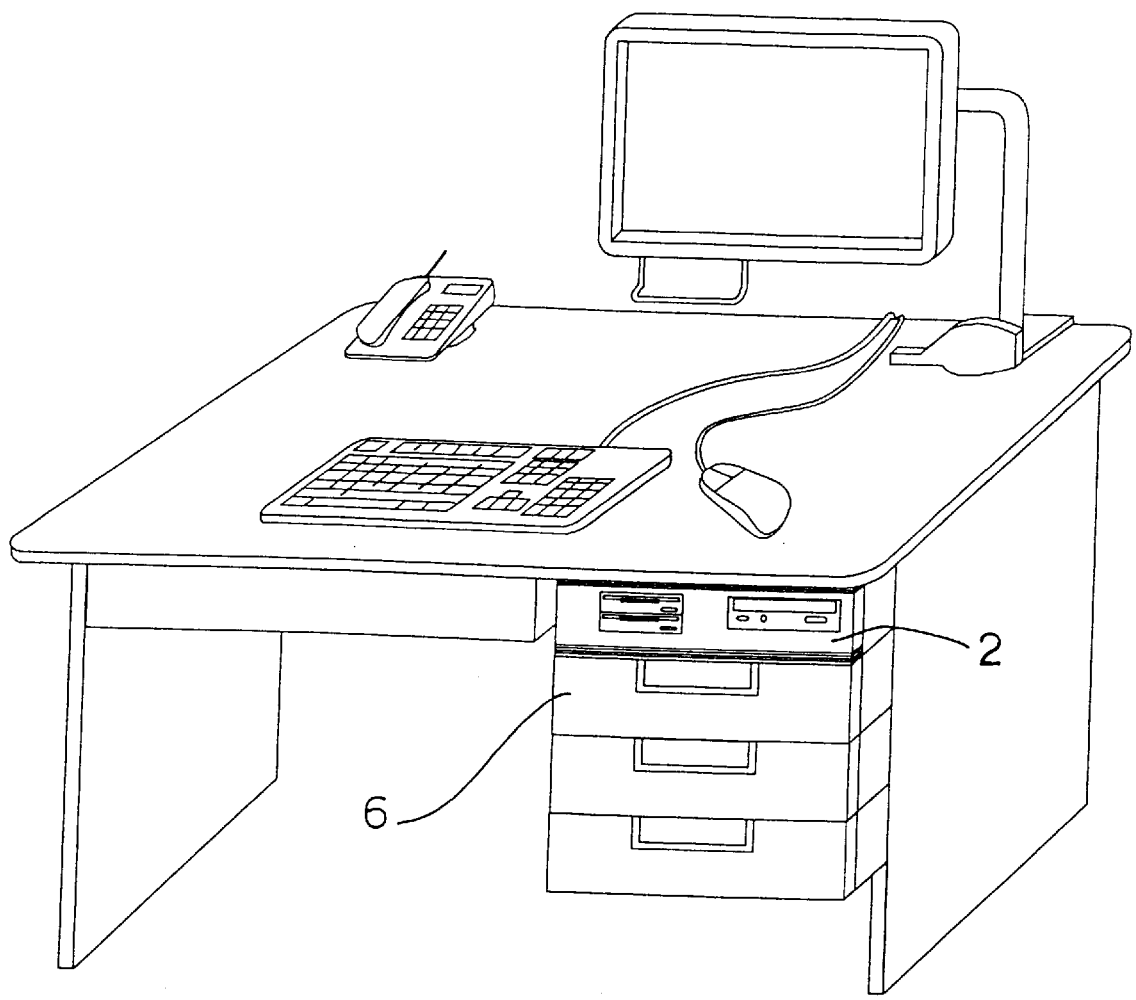
FIG. 8 shows the present invention installed in a computer deck.

Referring to FIGS. 7 and 8 and FIG. 3 again, stacks of ornamental sheets 21;22 may be adhered to top and bottom sides of the face panel 2 subject to the gaps in the desk.

What the invention claimed is:

1. A drawer type computer housing mounting system comprising a bottom shell, a top cover shell covered on said bottom shell at a top side, said top cover shell having two vertical side panels at two opposite sides, a face panel fastened to said bottom shell at a front side, and two sliding rails respectively fastened to the two opposite vertical side panels of said top cover shell for enabling it to be moved in and out of a desk between two sliding tracks inside said desk, wherein each of the vertical side panels of said top cover shell has pairs of oblique locating slots, and a plurality of vertical sliding slots; a plurality of sliding clips are respectively moved in the vertical sliding slots on the vertical side panels of said top cover shell and fixed in position by a respective screw to secure said sliding rails in place; said sliding rails comprise each a first wall and a second wall connected at right angles, and a plurality of mounting holes at said first wall and said second wall for connection to the oblique locating slots on the vertical side panels of said top cover shell by screws, said first wall and said second wall having different widths.

2. The drawer type computer housing mounting system of claim 1, wherein the oblique locating slots on the vertical side panels of said top cover shell have each a serrated side edge.

3. The drawer type computer housing mounting system of claim 1, wherein said face panel has top and bottom sides thereof respectively mounted with ornamental sheets.

* * * * *